United States Patent
Yao

(10) Patent No.: US 10,210,422 B2
(45) Date of Patent: Feb. 19, 2019

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Tetsuhiko Yao, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 15/389,412

(22) Filed: Dec. 22, 2016

(65) Prior Publication Data

US 2017/0206429 A1 Jul. 20, 2017

(30) Foreign Application Priority Data

Jan. 15, 2016 (JP) ................. 2016-006013

(51) Int. Cl.
| | | |
|---|---|---|
| *G06K 9/40* | (2006.01) | |
| *G06K 9/46* | (2006.01) | |
| *G06T 7/13* | (2017.01) | |
| *G06T 5/00* | (2006.01) | |

(52) U.S. Cl.
CPC ......... *G06K 9/4642* (2013.01); *G06K 9/4638* (2013.01); *G06T 5/002* (2013.01); *G06T 7/13* (2017.01); *G06T 2207/10116* (2013.01); *G06T 2207/20024* (2013.01)

(58) Field of Classification Search
None
See application file for complete search history.

(56) References Cited

U.S. PATENT DOCUMENTS

| | | | | |
|---|---|---|---|---|
| 6,167,654 B1* | 1/2001 | Wolf | ................ | E05F 1/008 16/63 |
| 6,400,853 B1* | 6/2002 | Shiiyama | ............ | G06F 17/3025 358/403 |
| 8,395,817 B2* | 3/2013 | Dai | .................. | H04N 1/56 358/1.9 |
| 8,417,059 B2* | 4/2013 | Yamada | ............. | H04N 5/23248 348/154 |
| 9,786,052 B2* | 10/2017 | Kunihiro | .............. | G06K 9/4642 |
| 2006/0204041 A1* | 9/2006 | Hammoud | .......... | G06K 9/00597 382/107 |
| 2010/0104197 A1* | 4/2010 | Sohma | ............. | G06F 17/30277 382/195 |
| 2010/0202665 A1* | 8/2010 | Mohammad | ....... | G06K 9/00885 382/115 |
| 2010/0290708 A1* | 11/2010 | Magai | ................. | G06K 9/6211 382/195 |

(Continued)

OTHER PUBLICATIONS

Line detecting in satellite imageery, G.J. Vanderburg, 1975, 2A-16 to 2A-26 (Year: 1975).*

(Continued)

*Primary Examiner* — Jayesh A Patel
(74) *Attorney, Agent, or Firm* — Venable LLC

(57) ABSTRACT

In order to shorten a time required to detect structure information of an image, in an image obtained by photographing a subject, feature amounts of pixel values in a block including a plurality of pixels are calculated, and the structure information is detected every (N×N) area of an input image on the basis of a combination of the feature amounts of the pixel values in a plurality of blocks.

13 Claims, 8 Drawing Sheets

(56) References Cited

U.S. PATENT DOCUMENTS

| | | | | |
|---|---|---|---|---|
| 2010/0321510 A1* | 12/2010 | Tsutsumi | ............... | G06T 5/003 |
| | | | | 348/208.4 |
| 2011/0139866 A1* | 6/2011 | Arakawa | ............ | H04N 1/32144 |
| | | | | 235/375 |
| 2012/0182441 A1* | 7/2012 | Sharman | ............... | G06T 3/4007 |
| | | | | 348/222.1 |
| 2013/0182898 A1* | 7/2013 | Maeda | ............... | G06K 9/00228 |
| | | | | 382/103 |

OTHER PUBLICATIONS

G.J. VanderBrug, "Line Detection in Satellite Imagery", Symposium on Machine Processing of Remotely Sensed Data, Jun. 3-5, 1975, p. 2A-16-20.

* cited by examiner

FIG. 9

|  | NON-APPLICATION | APPLICATION 1 | APPLICATION 2 |
|---|---|---|---|
| BLOCK CALCULATION AMOUNT | 176 CALCULATIONS | 12 CALCULATIONS | 24 CALCULATIONS |
| SUM CALCULATION AMOUNT |  | 116 CALCULATIONS | 80 CALCULATIONS |
| TOTAL CALCULATION AMOUNT | 176 CALCULATIONS | 128 CALCULATIONS | 104 CALCULATIONS |

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program and, more particularly, to a technique suitable for use in detection of a structure of an image.

Description of the Related Art

As a method of detecting structure information of an image from the image, there is a method whereby a feature extracting filter such as a VanderBrug filter or the like is used (VanderBrug, G. J, "Line Detection in Satellite Imagery", Symposium on Machine Processing of Remotely sensed Data, Jun. 3-5, 1975, Page 2A-[16-20]). According to the method whereby the VanderBrug filter is used, an area of N pixels (in the vertical direction)×N pixels (in the horizontal direction) is divided into three areas and a plurality of filters having different patterns (filter patterns) as patterns of those three areas are prepared. The filter is set for the image so that a center pixel of the filter is located at a target pixel of the image. Such operations that an average value of pixel values of the image is calculated every area of the filter and an absolute value of a difference between the average values of the pixel values of the respective areas is calculated are executed with respect to each filter. By comparing the absolute values of the differences of the average values of the pixel values of the respective areas, structure information showing a structure (feature) of a peripheral region of the target pixel is detected.

However, according to the technique disclosed in "Line Detection in Satellite Imagery" mentioned above, a plurality of filters (a plurality of filter patterns) are applied to respective pixels as filters each having a size of (N pixels (in the vertical direction)×N pixels (in the horizontal direction)) and the pixel values have to be added every pixel. Therefore, there is such a problem that a calculation amount is large and it takes a time for processing.

The invention is made in consideration of such problems and it is an aspect of the invention that a time which is required to detect structure information of an image is shortened.

SUMMARY OF THE INVENTION

According to an aspect of the invention, there is provided an information processing apparatus comprising: a setting unit configured to set a plurality of patterns of blocks each including a plurality of pixels; an obtaining unit configured to obtain feature amounts of pixel values in each of the plurality of set blocks; and a detecting unit configured to detect structure information of an area of an image on the basis of a feature amount which is calculated from the feature amounts of the pixel values obtained in a block obtained by combining the blocks in the plurality of patterns.

According to the aspect of the invention, the time which is required to detect the structure information of the image can be shortened.

Further features of the present invention will become apparent from the following description of exemplary embodiments with reference to the attached drawings.

BRIEF DESCRIPTION OF THE DRAWINGS

FIG. 9 is a diagram for illustrating a calculation amount of a sum of pixel values.

DESCRIPTION OF THE EMBODIMENTS

Preferred embodiments of the present invention will now be described in detail in accordance with the accompanying drawings.

First Embodiment

First, a first embodiment will be described.

Figure 1:
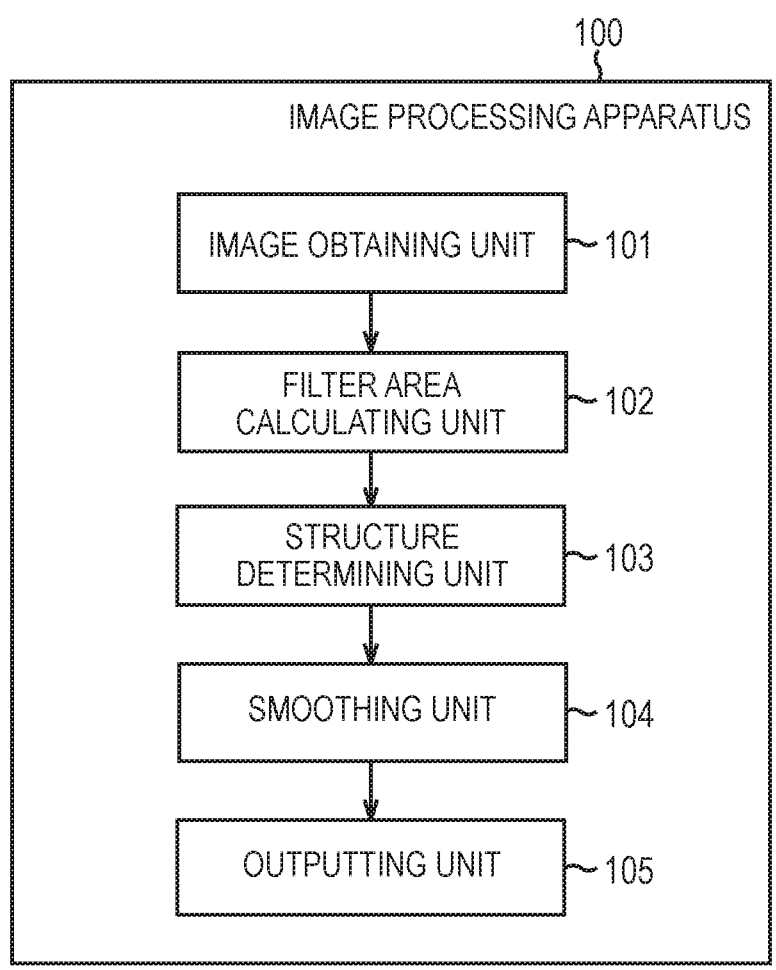
FIG. 1 is a diagram for illustrating a construction of an image processing apparatus.

FIG. 1 is a functional block diagram illustrating an example of a functional construction of an image processing apparatus 100. Although principal portions of the image processing apparatus 100 will be described hereinbelow, the image processing apparatus 100 may include other processing units. Hardware of the image processing apparatus 100 is realized by using an image processing apparatus having, for example, a CPU, a ROM, a RAM, an HDD, and various kinds of hardware.

The image processing apparatus 100 detects structure information, every (N×N) area, showing a structure in an area of N pixels (in the vertical direction)×N pixels (in the horizontal direction) (hereinbelow, referred to as an (N×N) area in accordance with necessity) in which a target pixel of an image is assumed to be a center. In the embodiment, a case where the image processing apparatus 100 executes a smoothing process as a process for reducing a noise of the image as an image process based on the detected structure information will be described as an example.

An image obtaining unit 101 obtains an image by photographing a subject. For example, the image obtaining unit 101 obtains a digital X-ray image of the subject. The digital X-ray image of the subject is obtained by, for example, irradiating an x-ray from an x-ray source (radiation source) toward the subject and detecting the X-ray transmitted through the subject. The image which is obtained by the image obtaining unit 101 may be any image so long as it is a digital image. In the following description, the image obtained by the image obtaining unit 101 or the image obtained by photographing the subject is called an input image in accordance with necessity.

A filter area calculating unit 102 makes a center pixel of the filter of the (N×N) area coincide with a position of the target pixel of the image. The filter area calculating unit 102 calculates feature amounts of pixel values of the input image in the relevant area every plural areas obtained by dividing the (N×N) area of the image which overlaps with such a filter in accordance with the filter pattern of the filter. The calculation of such feature amounts of the pixel values of the input image in each area is performed with respect to each of a plurality of filters having different filter patterns. In the embodiment, a case where an average value is used as a feature amount of the pixel value of the input image will be described as an example. In the embodiment, a case where the (N×N) area of the filter is divided into three areas will be described as an example. Therefore, patterns of the three areas become filter patterns. However, the division number of the area is not limited to 3. The filter is a filter (what is called a feature extracting filter) for detecting a structure (feature such as an edge, fine line, or the like) of a portion projected to the image. In the embodiment, a case where the filter is a VanderBrug filter will be described as an example.

A structure determining unit 103 selects one of a plurality of filters as a filter which is most matched with a structure of a peripheral region ((N×N) area) of the target pixel on the basis of a result of the calculation in the filter area calculating unit 102. The structure determining unit 103 determines structure information showing the structure in the peripheral region ((N×N) area) of the target pixel on the basis of the filter pattern in the selected filter.

A smoothing unit 104 executes a smoothing process according to the structure information determined by the structure determining unit 103 to the input image. The smoothing process according to the structure information denotes a process for reducing the noise while suppressing that such a structure is lost. Since the smoothing process according to the structure information can be realized by a well-known technique, its detailed description is omitted here.

An outputting unit 105 outputs an image to which the smoothing process has been executed in the smoothing unit 104. As an outputting form, for example, at least one of a display onto a computer display, a storage into an internal or external storage device of the image processing apparatus 100, and a transmission to an external apparatus can be used. In addition to the smoothing process, if another image process is executed in the image processing apparatus 100, the outputting unit 105 outputs an image to which such another image process has been executed in addition to the smoothing process.

Figure 2:
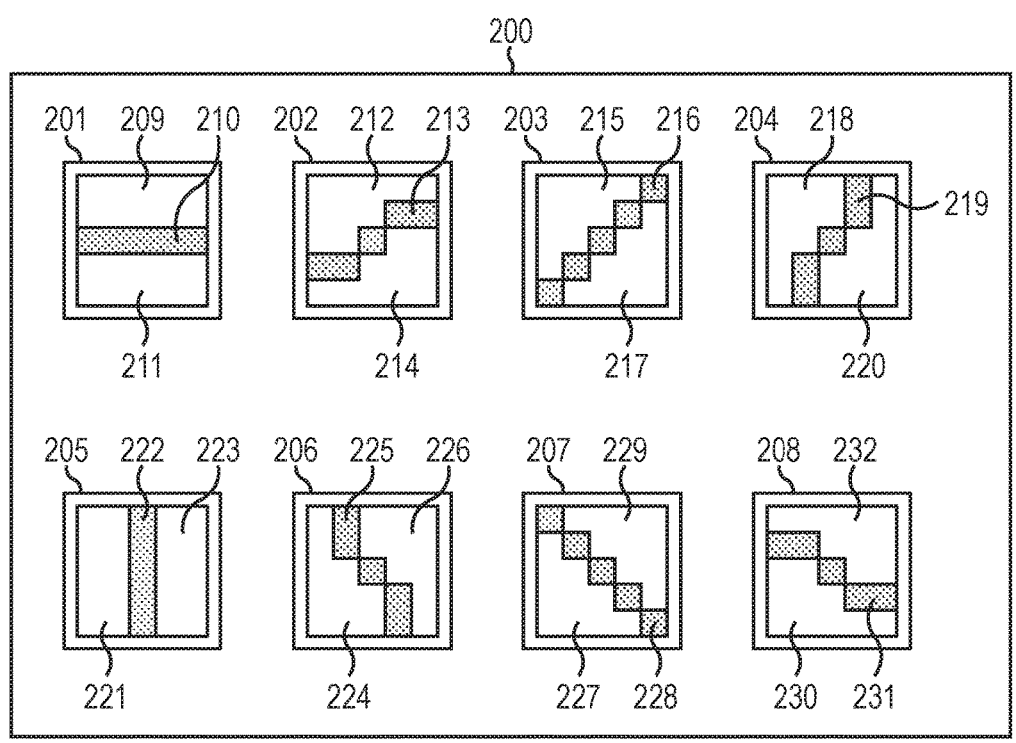
FIG. 2 is a diagram for illustrating an example of a filter.

FIG. 2 is a diagram illustrating an example of a group of filters 200 which are used in the embodiment. In the embodiment, a case where eight filters each having a filter size of 5×5 (size of 5 pixels (in the vertical direction)×5 pixels (in the horizontal direction)) are used will be described as an example. The filter size and the number of filters are not limited to those values.

In FIG. 2, eight filters 201 to 208 have different filter patterns. In the embodiment, the area of each of the filters 201 to 208 is divided into three areas. Therefore, patterns of those three areas become filter patterns. For example, the filter 201 is divided into three areas 209 to 211. Each of the other filters 202 to 208 is also divided into three areas as illustrated in FIG. 2.

Areas 210, 213, 216, 219, 222, 225, 228, and 231 in the filters 201 to 208 show shapes which are detected by the filters 201 to 208 (refer to painted regions in FIG. 2). In the example illustrated in FIG. 2, eight angles can be detected by the filters 201 to 208 of the (5×5) size. Specifically speaking, 0° (0 degree) can be detected by the area 210, 22.5° by the area 213, 45° by the area 216, 67.5° by the area 219, 90° by the area 222, 112.5° by the area 225, 135° by the area 228, and 157.5° by the area 231, respectively.

Besides them, areas 209, 211, 212, 214, 215, 217, 218, 220, 221, 223, 224, 226, 227, 229, 230, and 232 are included in the filters 201 to 208, respectively.

As mentioned above, in the embodiment, the center image of such a filter is made coincide with each pixel (target pixel) of the input image and a sum of pixel values of the input image included in each area is calculated. A value obtained by dividing the calculated sum of the pixel values by the number of pixels of the relevant area (that is, a value obtained by normalizing the pixel values in each area by a size of the relevant area) is calculated as an average value of the pixel values of the input image in the relevant area. Such processes are executed with respect to each of the eight filters 201 to 208. In the embodiment, a time required to calculate the sum of the pixel values of the input image included in each area among the foregoing processes is shortened. An example of such a method will be described hereinbelow.

Figure 3:
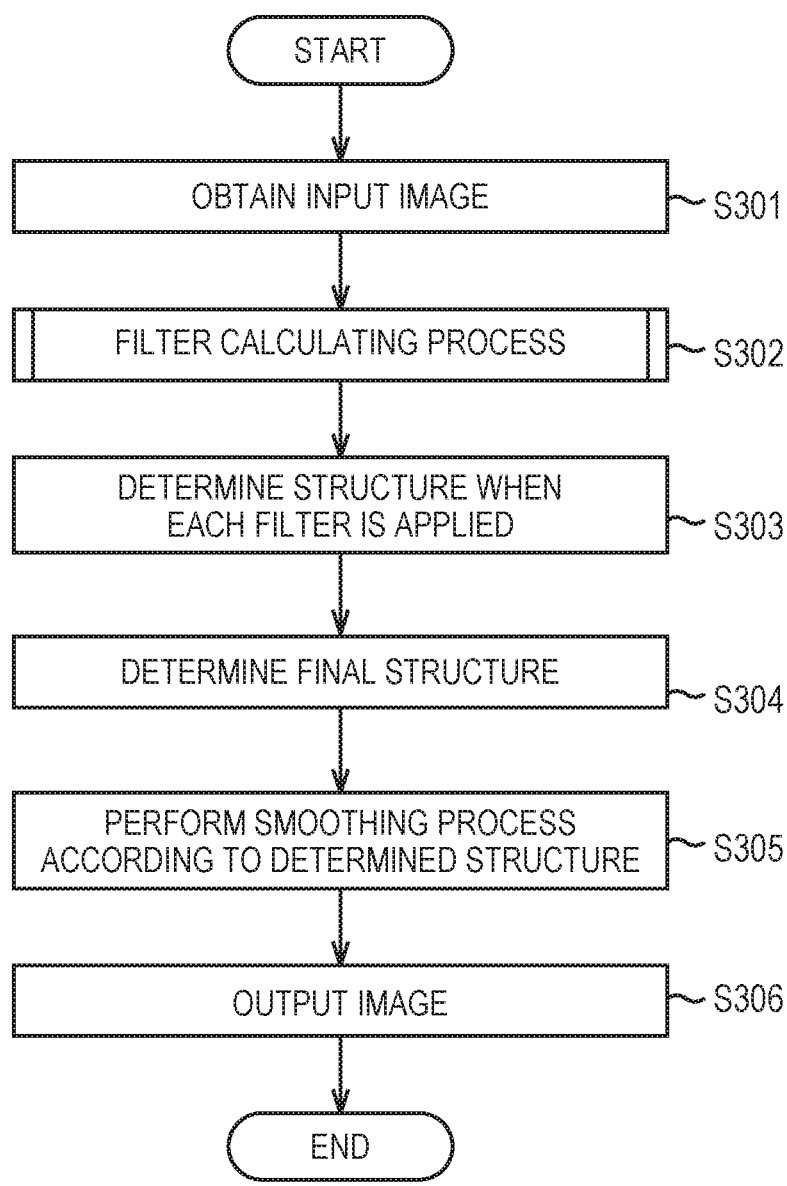
FIG. 3 is a flowchart for describing an outline of a processing in the image processing apparatus.

FIG. 3 is a flowchart for describing an example of an outline of a processing in the image processing apparatus 100.

In S301, the image obtaining unit 101 obtains the input image.

Subsequently, in S302, the filter area calculating unit 102 executes a filter calculating process. In the filter calculating process, an average value of the pixel values of the input image is calculated in each of the areas of the input image which overlap with the areas 209 to 232 of the filters 201 to 208. Such an average value is calculated with respect to each of the cases where all pixels of the input image are assumed to be a target pixel. Details of the filter calculating process will be described hereinbelow with reference to FIG. 4 and the like.

Subsequently, in S303, on the basis of the average value of the pixel values of the input image in each of the areas 209 to 232 calculated in S302, the structure determining unit 103 determines a structure of a peripheral region of the target pixel in the case where each of the filters 201 to 208 is applied. In the embodiment, since N=5, the peripheral region of the target pixel is the (5×5) area (area of 5 pixels (in the vertical direction)×5 pixels (in the horizontal direction)). A specific example of the process of S303 will be described. The process of S303 is not limited to the following contents.

It is assumed that an average value of the pixel values of the input image in the areas 209, 212, 215, 218, 221, 224, 227, and 230 is α, an average value of the pixel values of the input image in the areas 210, 213, 216, 219, 222, 225, 228, and 231 is β, and an average value of the pixel values of the input image in the areas 211, 214, 217, 220, 223, 226, 229, and 232 is γ, respectively. For example, the structure determining unit 103 determines to which one of the following four conditions (A) to (D) those average values correspond with respect to each of the cases where each of the filters 201 to 208 is applied.

(A) α≠β, and β≈γ
(B) α≈β, and β≠γ
(C) α≠β, β≠γ, and α≈γ
(D) α≈β≈γ

In (A) to (D), "≈" denotes that an absolute value of a difference between a value of the left side and a value of the right side is equal to or less than a threshold value and "≠" denotes that an absolute value of a difference between a value of the left side and a value of the right side is equal to or larger than a threshold value. Those threshold values may be the same value or different values. If those absolute values correspond to (A) or (B), this means that the structure in the peripheral region of the target pixel is an edge. If they correspond to (C), this means that the structure in the peripheral region of the target pixel is a fine line. If they correspond to (D), this means that the structure in the peripheral region of the target pixel is flat (does not include a boundary). As mentioned above, (D) is a condition to discriminate the presence or absence of the boundary.

Subsequently, in S304, the structure determining unit 103 determines a structure in the peripheral region of each target pixel of the input image on the basis of result of the calculation in S303. A specific example of the process of S304 will be described hereinbelow. However, the process of S304 is not limited to the following contents.

In S302, one of (A) to (D) is determined as a structure in the peripheral region of the target pixel in the case where each of the filters 201 to 208 is applied to each of the target pixels. The structure determining unit 103 calculates absolute values (=|α−β|, |β−γ|) of differences between the average value β of the areas (210, 213, etc.) showing the shapes to be detected by the filters 201 to 208 and the average values α and γ of the other areas (209, 211, 212, 214, etc.), respectively. Subsequently, the structure determining unit 103 selects, from the filters 201 to 208, one filter in which such an absolute value becomes a largest value. The structure determining unit 103 determines the structure (one of (A) to (D)) decided in S302 to the selected filter as a structure in the peripheral area ((5×5) area) of the target pixel. In this manner, the structure determining unit 103 determines the structure in the peripheral area ((5×5) area) of the target pixel with respect to each pixel of the input image. As mentioned above, the structure is determined every ((5×5) area) of the input image. At this time, if it is decided that the structure in the peripheral region of the target pixel is the edge or fine line on the basis of the foregoing (A) to (C), the foregoing angle becomes an angle of the relevant structure (edge or fine line).

Subsequently, in S305, the smoothing process according to the structure information determined in S304 is executed to the input image.

Finally, the outputting unit 105 outputs the image to which the smoothing process has been executed in S306. The process by the flowchart of FIG. 3 is ended.

Figure 4:
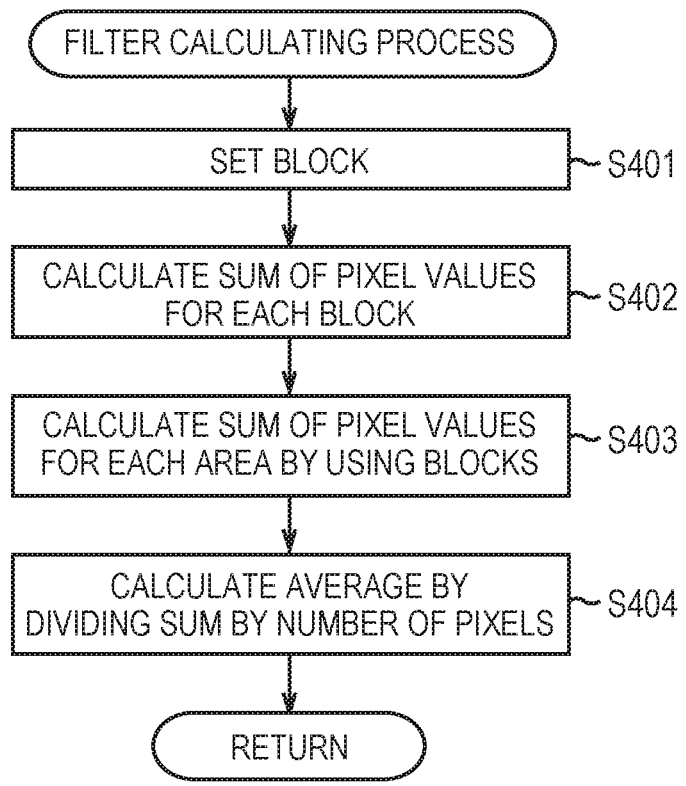
FIG. 4 is a flowchart for describing an example of a filter calculating process.

Subsequently, an example of the filter calculating process in S302 in FIG. 3 will be described with reference to a flowchart of FIG. 4 and the like. It is assumed that the flowchart of FIG. 4 is repetitively executed with respect to each pixel of the input image.

Figure 5:
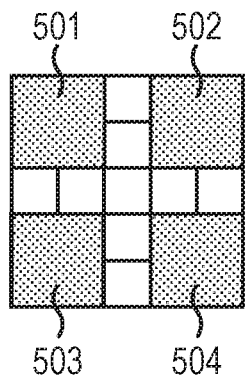
FIG. 5 is a diagram for illustrating a first example of a block.

First, in S401, the filter area calculating unit 102 sets at least one block including a plurality of pixels to the (N×N) area (in the example illustrated in FIG. 2, the (5×5) area) in which the target pixel is a center in the areas of the input image. The (N×N) area (in the example illustrated in FIG. 2, the (5×5) area) of the input image is an area of the same size as the filter size. FIG. 5 is a diagram illustrating an example of blocks which are set for the (N×N) area of the input image.

In the example illustrated in FIG. 5, a block 501 including four upper left pixels, a block 502 including four upper right pixels, a block 503 including four lower left pixels, and a block 504 including four lower right pixels are set for the (5×5) area, respectively. As illustrated in FIGS. 2 and 5, sizes of the blocks 501 to 504 are set so as to be smaller than a size of at least one of the areas 209 to 232 which are set to the filters 201 to 208. It is assumed that information showing which type of block is set at which position in the (5×5) area of the input image has been preset in the image processing apparatus 100.

Subsequently, in S402, the filter area calculating unit 102 individually calculates, every block, a sum of pixel values in the areas of the blocks 501 to 504 set in S401 in the (5×5) area of the input image. In the example illustrated in FIG. 5, since each of the blocks 501 to 504 includes of four pixels, in each of the blocks 501 to 504, the addition is performed three times, so that the addition is performed 12 (=3 times×4 blocks) times in total.

Subsequently, in S403, the filter area calculating unit 102 makes a center of the filter coincide with a position of the target pixel of the input image. The filter area calculating unit 102 calculates a sum of pixel values of the input image included in the relevant area every three areas which are the three areas obtained by dividing the (N×N) area of the input image and overlap with the three areas set for the relevant filter. At this time, if all of the (one) block is included in the divided areas, the sum of the pixel values in the areas of the relevant block calculated in S402 is used. That is, in the process of S403, with respect to the areas including all of the relevant block among the relevant divided areas, the addition of the pixel values of every pixel is not performed but the sum of the pixel values calculated in S402 is used. The process of S403 is individually executed with respect to each of the eight filters 201 to 208.

Figure 6:
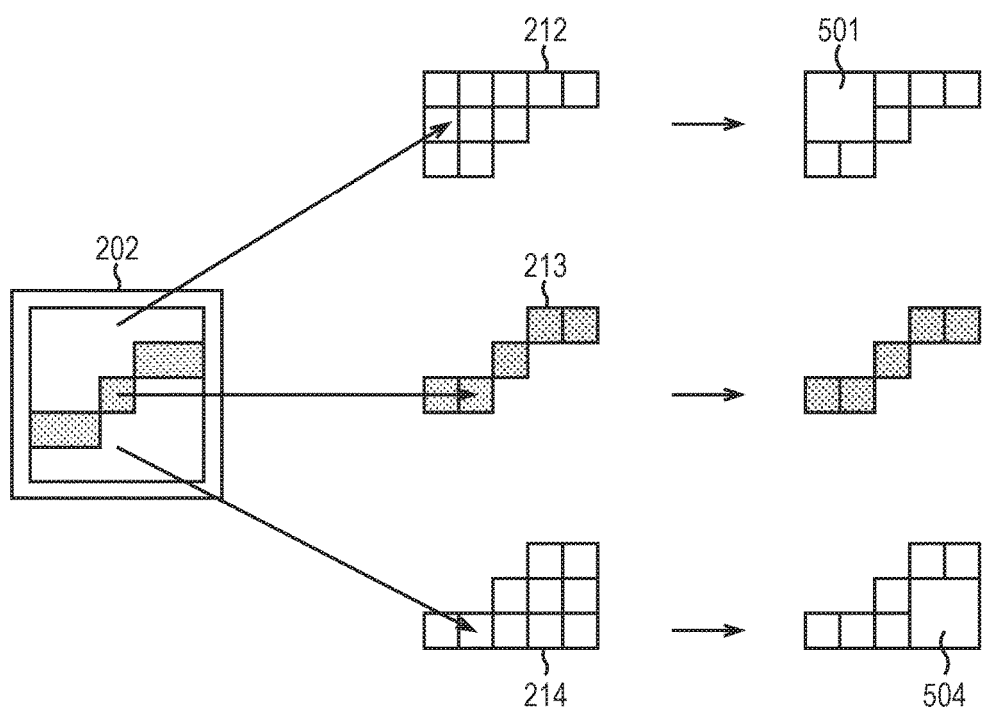
FIG. 6 is a diagram for describing a first example of a calculating method of a sum of pixel values.

FIG. 6 is a diagram for describing an example of a method of calculating a sum of pixel values for every area of the filter by using the blocks. In FIG. 6, an example of the filter 202 illustrated in FIG. 2 will be described.

In FIG. 6, the filter 202 is constructed by the three areas 212, 213, and 214 as illustrated in FIG. 2. All areas of the block 501 illustrated in FIG. 5 are included in the area 212. Therefore, the filter area calculating unit 102 adds the pixel values of the block 501 and the pixel value of each pixel of the area 212 other than the block 501 and calculates a sum of pixel values of the area 212 in the input image. Since the pixel values of the block 501 have been calculated in S402, such values are used in S403 and the pixel values of the block 501 are not newly calculated. When the sum of the pixel values of the area 212 in the input image is calculated, the addition is performed six times.

Similarly, all areas of the block 504 illustrated in FIG. 5 are included in the area 214. Therefore, the filter area calculating unit 102 adds the pixel values of the block 504 and the pixel value of each pixel of the area 214 other than the block 504 and calculates a sum of pixel values of the area 214 in the input image. Even when the sum of the pixel values of the area 214 in the input image is calculated, the addition is performed six times.

On the other hand, all areas of the blocks 501 to 504 illustrated in FIG. 5 are not included in the area 213. Therefore, the filter area calculating unit 102 adds the pixel values of the pixels included in the area 213 one by one and calculates a sum of the pixel values of the area 213 in the input image. When the sum of the pixel values of the area 213 in the input image is calculated, the addition is performed four times.

Also with respect to the case where the other filters 201 and 203 to 208 are applied, a sum of pixel value of each area in the input image is similarly calculated.

Subsequently, in S404, the filter area calculating unit 102 calculates a value obtained by dividing the sum of the pixel values of each area calculated in S403 by the number of pixels constructing the relevant area as an average value of the pixel values of the input image in the relevant area. For example, in FIG. 6, the number of pixels constructing the area 212 is equal to 10. Therefore, assuming that the sum of the pixel value of the area 212 is equal to X, an average value of the pixel values of the input image in the area 212 is equal to X/10. The process of S404 is individually executed with respect to each of the areas 209 to 232 of the eight filters 201 to 208.

If all pixels of the input image are set as target pixels and the processes of S401 to S404 are repetitively executed, the processing routine advances to the process of S303 in FIG. 3 mentioned above.

Second Embodiment

Subsequently, a second embodiment will be described. In the first embodiment, the case of setting only one block group in which four blocks arranged at the positions which are point-symmetrical with respect to the center pixel of the relevant area in the area of the same size as the filter size among the areas of the input image are collected as one set has been described as an example. On the other hand, in the present embodiment, a case where a plurality of such block groups are set will be described as an example. As mentioned above, the present embodiment differs from the first embodiment mainly with respect to a process which is executed because the number of blocks to be set for the input image increases. Therefore, in the description of the embodiment, substantially the same portions as those in the first embodiment are designated by the same reference numerals as those added in FIGS. 1 to 6 and a detailed description is omitted.

Figure 7A:
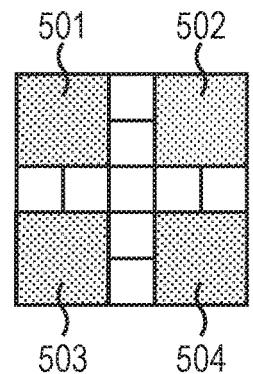
FIGS. 7A, 7B, 7C, and 7D are diagrams for illustrating a second example of a block.

FIGS. 7A to 7D are diagrams illustrating an example of blocks which are set for the (N×N) area of the input image. FIG. 7A illustrates the blocks 501 to 504 illustrated in FIG. 5.

Figure 7B:
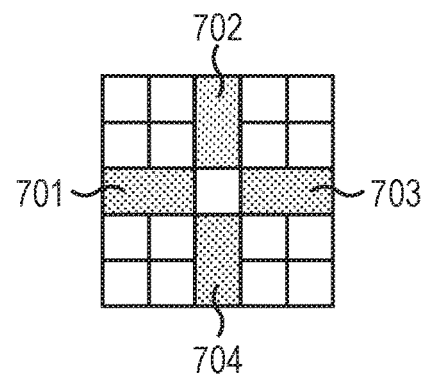

In the example illustrated in FIG. 7B, four blocks 701 to 704 each including two pixels are set. The block 701 is a block including two pixels arranged in the horizontal direction on the left side of the center pixel of the (5×5) area. The block 702 is a block including two pixels arranged in the vertical direction on the upper side of the center pixel of the (5×5) area. The block 703 is a block including two pixels arranged in the horizontal direction on the right side of the center pixel of the (5×5) area. The block 704 is a block including two pixels arranged in the vertical direction on the lower side of the center pixel of the (5×5) area.

Figure 7C:
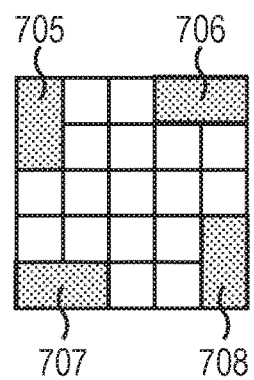
Figure 7D:
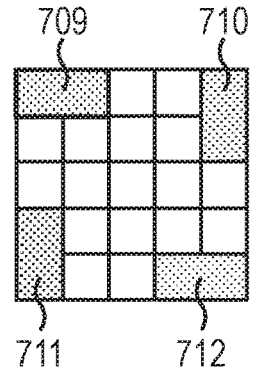

Also in the examples illustrated in FIGS. 7C and 7D, in a manner similar to FIG. 7B, four blocks 705 to 708 each including two pixels and four blocks 709 to 712 each including two pixels are set. The block 705 is a block including two pixels arranged in the vertical direction at the upper left corner of the (5×5) area. The block 706 is a block including two pixels arranged in the horizontal direction at the upper right corner of the (5×5) area. The block 707 is a block including two pixels arranged in the horizontal direction at the lower left corner of the (5×5) area. The block 708 is a block including two pixels arranged in the vertical direction at the lower right corner of the (5×5) area. The block 709 is a block including two pixels arranged in the horizontal direction at the upper left corner of the (5×5) area. The block 710 is a block including two pixels arranged in the vertical direction at the upper right corner of the (5×5) area. The block 711 is a block including two pixels arranged in the vertical direction at the lower left corner of the (5×5) area. The block 712 is a block including two pixels arranged in the horizontal direction at the lower right corner of the (5×5) area.

Also in the embodiment, in a manner similar to the first embodiment, sizes of the blocks 501 to 504 and 701 to 712 are set so as to be smaller than the size of at least one of the areas 209 to 232 which are set for the filters 201 to 208. It is assumed that information showing which type of block is set at which position in the (5×5) area of the input image has been preset in the image processing apparatus 100.

In S401 in FIG. 4, the filter area calculating unit 102 individually sets the blocks 501 to 504 and 701 to 712 as mentioned above for the (5×5) area by using the target pixel as a center. In S402, the filter area calculating unit 102 individually calculates, every block, a sum of pixel values in the blocks 501 to 504 and 701 to 712 set in S401 in the (5×5) area of the input image. As described in the first embodiment, the addition is performed three times in each of the blocks 501 to 504. The addition is performed once in each of the blocks 701 to 712. Therefore, the addition is performed 24 times (=3 times×4 blocks+1 time×12 blocks) in total.

Subsequently, in S403, the filter area calculating unit 102 makes the center of the filter coincide with the position of the target pixel of the input image. The filter area calculating unit 102 calculates a sum of pixel values of the input image included in the relevant area every three areas which are the three areas obtained by dividing the (N×N) area of the input image and overlap with the three areas set for the relevant filter. In a manner similar to the first embodiment, if all of the (one) block is included in the divided areas, the sum of the pixel values in the areas of the relevant block calculated in S402 is used.

Figure 8:
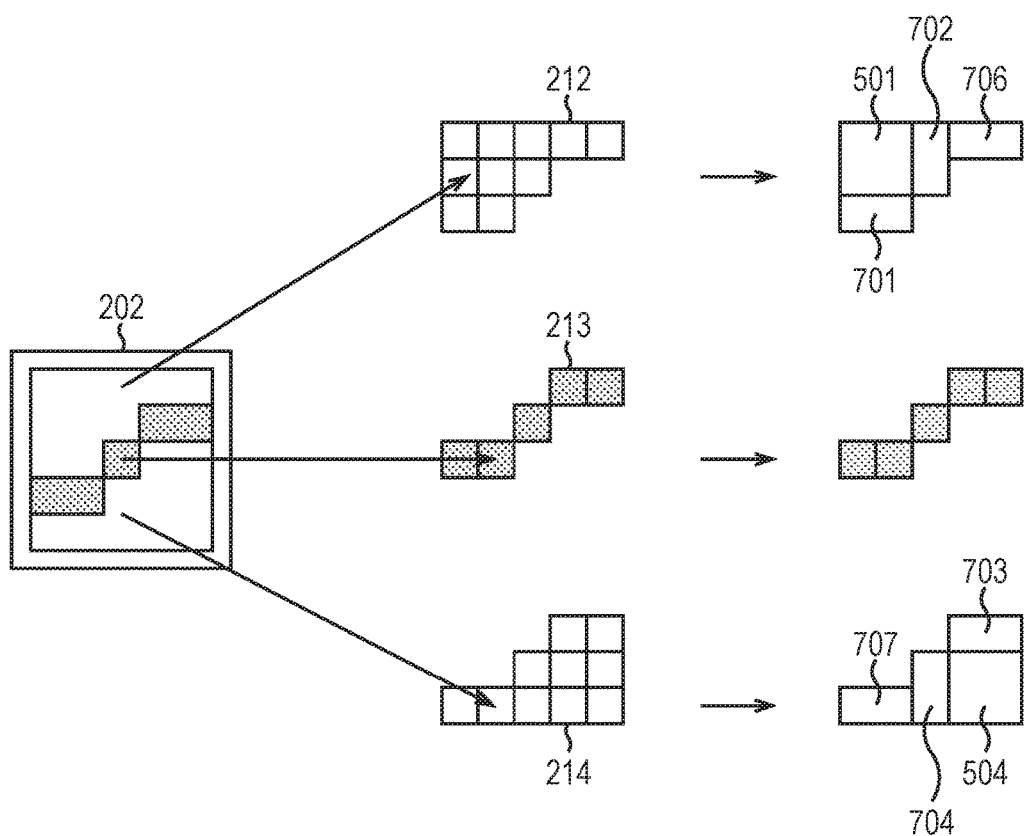
FIG. 8 is a diagram for describing a second example of a calculating method of a sum of pixel values.

FIG. 8 is a diagram for describing an example of a method of calculating a sum of pixel values of every area of the filter by using the blocks. In FIG. 8, a description will be made with respect to the filter 202 illustrated in FIG. 2 as an example for comparison with FIG. 6.

In FIG. 8, the filter 202 is constructed by the three areas 212, 213, and 214. Besides the block 501 illustrated in FIG. 7A, all areas of the blocks 701, 702, and 706 are included in the area 212. Therefore, the filter area calculating unit 102 adds pixel values of partial areas consisting of a combination of the blocks 501, 701, 702, and 706 as partial areas of the (5×5) area of the input image and calculates a sum of the pixel values of the area 212 in the input image. Since the pixel values of the blocks 501, 701, 702, and 706 have been calculated in S402, in S403, those values are used and pixel values of the blocks 501, 701, 702, and 706 are not newly calculated. When the sum of the pixel values of the area 212 in the input image is calculated, the addition is performed three times.

Similarly, besides the block 504 illustrated in FIG. 5, all areas of the blocks 703, 704, and 707 are included in the area 214. Therefore, the filter area calculating unit 102 adds pixel values of partial areas consisting of a combination of the blocks 504, 703, 704, and 707 as partial areas of the (5×5) area of the input image and calculates a sum of the pixel values of the area 214 in the input image. When the sum of the pixel values of the area 214 in the input image is also calculated, the addition is performed three times.

On the other hand, all of the areas of the blocks 501 to 504 illustrated in FIG. 5 are not included in the area 213. Therefore, the filter area calculating unit 102 adds pixel values, one by one, included in the area 213 and calculates a sum of pixel values of the area 213 in the input image. When the sum of the pixel values of the area 213 in the input image is also calculated, the addition is performed four times.

Also with respect to a case where the other filters 201 and 203 to 208 are applied, similarly, a sum of pixel values of each area in the input image is calculated.

(Comparison of Calculation Amounts)

FIG. 9 is a diagram illustrating an example of a calculation amount of the sum of the pixel values of each area in the input image in a table form. In this instance, the number of addition times of the pixel values in the case where a center of each of the filters 201 to 208 illustrated in FIG. 2 is made coincident with one certain pixel of the input image and a sum of pixel values of each of the areas 209 to 232 in the input image is calculated is shown as the number of calculations.

In FIG. 9, non-application shows the number of calculations in the case where the blocks described in the first and second embodiments are not set and the pixel values of each of the areas 209 to 232 are added one pixel by one is shown. In this case, in the areas (210, 213, etc.) showing the shapes to be detected by the filters 201 to 208, the addition is performed four times, respectively. In the other areas (209, 211, 212, 214, etc.), the addition is performed nine times, respectively. Therefore, there are eight filters in which the calculation amount is equal to 22. Thus, the total calculation amount is equal to 176 (=8×22 (=9×2+4)).

In FIG. 9, as described in the first embodiment, Application 1 shows the number of calculations in the case where the blocks 501 to 504 are set. In this case, in the blocks 501 to 504, the addition is performed three times, respectively. Thus, a block calculation amount as a calculation amount of the pixel values of the blocks 501 to 504 is equal to 12 (=4×3). In the areas (210, 213, etc.) showing the shapes to be detected by the filters 201 to 208, the addition is performed four times, respectively. In the areas 209, 211, 221, and 223 among the other areas, the addition is performed three times, respectively. In the areas 212, 213, 215, 217, 218, 220, 224, 226, 227, 229, 230, and 232, the addition is performed six times, respectively. Therefore, there are two filters (filters 201, 205) in which the calculation amount is equal to 10 and there are six filters (filters 202 to 204, 206 to 208) in which the calculation amount is equal to 16. Thus, the total calculation amount is equal to 128 (=12+2×10(=3× 2+4)+6×16(=6×2+4)).

In FIG. 9, as described in the second embodiment, Application 2 shows the number of calculations in the case where the blocks 501 to 504 and 701 to 712 are set. In this case, in the blocks 501 to 504, the addition is performed three times, respectively. In the blocks 701 to 712, the addition is performed once, respectively. Thus, a block calculation amount as a calculation amount of the pixel values of the blocks 501 to 504 and 701 to 712 is equal to 24 (=4×3+12× 1). In the areas (210, 213, etc.) showing the shapes to be detected by the filters 201 to 208, the addition is performed four times, respectively. In the areas 209, 211, 221, and 223 among the other areas, the addition is performed two times, respectively. In the areas 212, 214, 218, 219, 224, 226, 230, and 232, the addition is performed three times, respectively. In the areas 215, 217, 227, and 229, the addition is performed four times, respectively. Therefore, there are two filters (filters 201, 205) in which the calculation amount is equal to 8, there are four filters (filters 202, 204, 206, 207) in which the calculation amount is equal to 10, and there are two filters (filters 203, 207) in which the calculation amount is equal to 12. Thus, the total calculation amount is equal to 104 (=24+2×8(=2×2+4)+4×10(=3×2+4)+2×12(=4×2+4)).

As described above, in the image obtained by photographing the subject, feature amounts of the pixel values in the block including a plurality of pixels are calculated and structure information is detected every (N×N) area of the input image on the basis of a combination of the feature amounts of the pixel values in a plurality of blocks. For example, first, a plurality of blocks (501, etc.) each including a plurality of pixels are set for the (N×N) area of the input image, and a sum of pixel values in the relevant plurality of blocks is calculated. After that, the sums of the pixel values in the blocks are respectively used and a sum of pixel values in a plurality of areas (209 to 211, etc.) obtained by dividing the (N×N) area of the input image is calculated every relevant area. An average value of the pixel values in the relevant area is calculated and structure information is detected every (N×N) area of the input image by using the average value. Therefore, a calculation amount at the time of calculating the sum of the pixel values in the (N×N) area of the input image can be reduced. Consequently, a processing time required to detect the structure can be shortened without deteriorating a detection precision of the structure in the image.

In the area of the same size as the filter size among the areas of the input image, by setting a plurality of sets each consisting of four blocks arranged at the positions which are point-symmetrical with respect to the center pixel of such an area, the calculation amount can be further decreased.

In the first and second embodiments, in the area of the same size as the filter size among the areas of the input image, the case of setting the four blocks arranged at the positions which are point-symmetrical with respect to the center pixel of such an area has been described as an example. However, in the area of the input image of the same size as the filter size, as the four blocks arranged at the positions which are point-symmetrical with respect to the center pixel of such an area, blocks other than the blocks illustrated in FIGS. 7A to 7D may be set. For example, in FIGS. 7A to 7D, the four blocks are set in such a manner that one of the long sides and one of the short sides of a rectangle coincide with edges of the area. However, it is not always necessary to set the blocks as mentioned above. For example, the four blocks may be point-symmetrically arranged with respect to the center pixel in such a manner that only one of the short sides of a rectangle coincides with the edge of the area. Or, four blocks including a plurality of pixels which are mutually adjacent in the oblique direction may be point-symmetrically arranged with respect to the center pixel. The number of blocks arranged at the point-symmetrical positions mentioned above is not limited to 4. Further, a plurality of pixels forming one block may be pixels existing at remote positions. The number of pixels forming one block is not limited to 2 or 4. The number of blocks, the number of pixels forming the block, and the positions of the blocks are not limited so long as the total calculation amount is smaller than that in the case where the pixel values of the input image are added one pixel by one (that is, in the case of non-application illustrated in FIG. 9) as mentioned above.

In the second embodiment, the case where the areas obtained by dividing the (N×N) area of the input image and the partial areas consisting of a combination of a plurality of blocks coincide has been described as an example (refer to the area 212, the blocks 501, 701, 702, 706, and the like in FIG. 8). That is, the case where the partial areas consisting of a combination of a plurality of blocks are used as partial areas of the (N×N) area of the input image has been described as an example. However, it is not always necessary to use such a construction. A combination of a plurality of blocks and individual pixels which are not gathered by a block may be included in the areas obtained by dividing the (N×N) area of the input image. That is, as the partial areas of the (N×N) area of the input image, the partial areas consisting of a combination of a plurality of blocks and the individual pixels which are not gathered by a block may be used.

In the first embodiment, the case where the areas obtained by dividing the (N×N) area of the input image are the area consisting of one block and the individual pixels which are not gathered by a block has been described as an example (refer to the area 212, the block 501, and the like in FIG. 6). However, the areas obtained by dividing the (N×N) area of the input image and one block may be made coincide.

The foregoing embodiments are nothing but specific examples when embodying the invention and the technical scope of the invention must not be limitedly interpreted. That is, the invention can be embodied by various forms without departing from a technical idea or principal feature of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-006013, filed Jan. 15, 2016, which is hereby incorporated by reference herein in its entirety.

What is claimed is:

1. An information processing apparatus comprising:
a memory storing a program; and
one or more processors which, by executing the program, function as:
a setting unit configured to set a plurality of patterns of blocks including a plurality of pixels;
an obtaining unit configured to obtain feature amounts of pixel values in the plurality of blocks; and
a detecting unit configured to detect structure information of an image area of an image on the basis of the feature amounts of the pixel values obtained in the plurality of patterns,
wherein the plurality of patterns are set as block groups in which the plurality of blocks arranged at positions, which are point-symmetrical with respect to a center pixel in the image area.

2. The information processing apparatus according to claim 1, wherein the obtaining unit is configured to calculate a sum of the pixel values in a block.

3. The information processing apparatus according to claim 2, wherein the detecting unit is configured to detect the structure information of the area of the image by using the sum of the pixel values in the block included in the area of the image.

4. The information processing apparatus according to claim 1, wherein the plurality of blocks are set into the area of the image.

5. The information processing apparatus according to claim 1, wherein a number of the plurality of blocks arranged at the positions which are point-symmetrical with respect to the center pixel in the area of the image is equal to 4.

6. The information processing apparatus according to claim 1, wherein a size of the block groups is smaller than a size of the area of the image.

7. The information processing apparatus according to claim 1, wherein the structure information includes at least any one of information of an edge, information of a fine line, and information of the presence or absence of a boundary shown in the image.

8. The information processing apparatus according to claim 1, wherein the area of the image is an area of a size of 5 pixels in the vertical direction×5 pixels in the horizontal direction.

9. The information processing apparatus according to claim 1, wherein
the structure information includes at least any one of information of an edge and information of a fine line shown in the image, and
the detecting unit is configured to detect at least any one of an angle of the edge and an angle of the fine line, every area of the image, by using the feature amounts of the pixel values of the image in partial areas which are partial areas of the area of the image and consist of a combination of the plurality of blocks.

10. The information processing apparatus according to claim 1, wherein the detecting unit is configured to detect the structure information every area of the image by using a difference of average values of the pixel values of the image in partial areas which are partial areas of the area of the image and consist of a combination of the plurality of blocks.

11. The information processing apparatus according to claim 1, wherein the detecting unit is configured to detect the structure information every area of the image by using the feature amounts of the pixel values of the image in partial areas which are partial areas of the area of the image and consist of a combination of the plurality of blocks.

12. An information processing method comprising:
setting a plurality of patterns of blocks including a plurality of pixels;
obtaining feature amounts of pixel values in the plurality of blocks; and
detecting structure information of an image area of an image on the basis of the feature amounts of the pixel values obtained in the plurality of patterns, wherein the plurality of patterns are set as block groups in which the plurality of blocks arranged at positions, which are point-symmetrical with respect to a center pixel in the image area.

13. A non-transitory computer-readable storage medium storing a program for causing a computer to function as units of an information processing apparatus comprising:
- a setting unit configured to set a plurality of patterns of blocks including a plurality of pixels;
- an obtaining unit configured to obtain feature amounts of pixel values in the plurality of blocks; and
- a detecting unit configured to detect structure information of an image area of an image on the basis of the feature amounts of the pixel values obtained in the plurality of patterns,
- wherein the plurality of patterns are set as block groups in which the plurality of blocks arranged at positions, which are point-symmetrical with respect to a center pixel in the image area.

* * * * *